United States Patent
Ng-Thow-Hing et al.

(10) Patent No.: US 9,469,248 B2
(45) Date of Patent: Oct. 18, 2016

(54) SYSTEM AND METHOD FOR PROVIDING SITUATIONAL AWARENESS IN A VEHICLE

(71) Applicant: Honda Motor Co., Ltd., Tokyo (JP)

(72) Inventors: Victor Ng-Thow-Hing, Sunnyvale, CA (US); Karlin Bark, Menlo Park, CA (US); Cuong Tran, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 11 days.

(21) Appl. No.: 14/641,493

(22) Filed: Mar. 9, 2015

(65) Prior Publication Data
US 2016/0264045 A1    Sep. 15, 2016

Related U.S. Application Data

(60) Provisional application No. 62/062,640, filed on Oct. 10, 2014.

(51) Int. Cl.
| | | |
|---|---|---|
| *B60Q 1/00* | (2006.01) | |
| *B60Q 9/00* | (2006.01) | |
| *B60R 1/00* | (2006.01) | |
| *G01S 13/53* | (2006.01) | |

(52) U.S. Cl.
CPC . *B60Q 9/00* (2013.01); *B60R 1/00* (2013.01); *G01S 13/53* (2013.01); *B60R 2300/205* (2013.01)

(58) Field of Classification Search
CPC .... B60Q 9/008; G60R 16/0232; B60R 1/00; B60K 35/00; G01S 13/726; G01S 13/006; G01S 13/53; G01S 13/34

USPC ......... 340/435, 438, 905, 903; 348/148, 48; 345/7; 701/532, 117, 301; 342/59, 174, 342/107

See application file for complete search history.

(56) References Cited

U.S. PATENT DOCUMENTS

| | | | | |
|---|---|---|---|---|
| 5,826,216 A | * | 10/1998 | Lyons | ............... G01S 13/34 342/43 |
| 5,929,786 A | | 7/1999 | Schofield et al. | |
| 6,225,891 B1 | * | 5/2001 | Lyons | ............... B60Q 9/008 340/435 |
| 6,429,789 B1 | | 8/2002 | Kiridena et al. | |
| 6,559,761 B1 | | 5/2003 | Miller et al. | |
| 6,611,759 B2 | * | 8/2003 | Brosche | ............... G01S 13/53 340/436 |
| 6,727,808 B1 | | 4/2004 | Uselmann | |
| 7,049,945 B2 | | 5/2006 | Breed et al. | |
| 7,209,221 B2 | | 4/2007 | Breed et al. | |
| 7,355,524 B2 | | 4/2008 | Scofield | |
| 7,755,508 B2 | | 7/2010 | Watanabe et al. | |
| 7,852,462 B2 | | 12/2010 | Breed et al. | |
| 8,395,529 B2 | | 3/2013 | Seder et al. | |

(Continued)

*Primary Examiner* — Hoi Lau
(74) *Attorney, Agent, or Firm* — Rankin, Hill & Clark LLP

(57) ABSTRACT

A method and system for providing situational awareness in a vehicle. The method and system include receiving environmental sensor data and vehicle performance sensor data. The method and system also include compiling the environmental sensor data and the vehicle performance data. The method and system additionally include determining one or more situational risks that are posed to the vehicle that occur within a surrounding environment of the vehicle based on the compiled environmental sensor data and the vehicle performance data. The method and system further include generating one or more projected graphical objects that represent the one or more situational risks that are determined to be posed to the vehicle.

17 Claims, 8 Drawing Sheets

(56) References Cited

U.S. PATENT DOCUMENTS

| | | |
|---|---|---|
| 8,482,486 B2 | 7/2013 | Seder et al. |
| 8,680,978 B2 | 3/2014 | Yang et al. |
| 8,754,760 B2 | 6/2014 | Augst |
| 8,818,647 B2 | 8/2014 | Breed |
| 9,255,988 B2 * | 2/2016 | Zeng .................... G01S 13/726 |
| 2003/0036850 A1 * | 2/2003 | Brosche ................. G01S 13/53 701/301 |
| 2004/0189451 A1 * | 9/2004 | Zoratti .................. B60Q 9/008 340/435 |
| 2006/0058963 A1 * | 3/2006 | Smith ................ B60R 16/0232 701/301 |
| 2008/0204208 A1 * | 8/2008 | Kawamata ................ B60R 1/00 340/435 |
| 2009/0140845 A1 * | 6/2009 | Hioki .................... B60K 35/00 340/425.5 |
| 2009/0187333 A1 * | 7/2009 | Mueller ............. G01C 21/3647 701/532 |
| 2009/0225434 A1 | 9/2009 | Nicholas et al. |
| 2010/0182140 A1 * | 7/2010 | Kohno .................. B60K 35/00 340/438 |
| 2011/0279254 A1 * | 11/2011 | Raste .................... B60W 30/09 340/438 |
| 2012/0320207 A1 * | 12/2012 | Toyofuku .................. B60R 1/00 348/148 |
| 2012/0323473 A1 * | 12/2012 | Irie ....................... B60W 10/06 701/117 |
| 2013/0154816 A1 | 6/2013 | Giesler et al. |
| 2014/0002252 A1 * | 1/2014 | Fong ..................... B60Q 9/008 340/435 |
| 2014/0019005 A1 | 1/2014 | Lee et al. |
| 2014/0097968 A1 * | 4/2014 | Kamiya ............... B60Q 1/0023 340/905 |
| 2015/0070207 A1 * | 3/2015 | Millar ................... G01S 13/006 342/174 |
| 2015/0198711 A1 * | 7/2015 | Zeng .................... G01S 13/726 342/59 |
| 2015/0331236 A1 * | 11/2015 | Roth ..................... B60K 37/00 348/48 |
| 2016/0004076 A1 * | 1/2016 | Matsubara ......... G02B 27/0101 345/7 |
| 2016/0059783 A1 * | 3/2016 | Sisbot .................... B60R 1/001 340/901 |
| 2016/0129836 A1 * | 5/2016 | Sugita ..................... B60R 1/00 701/41 |

\* cited by examiner

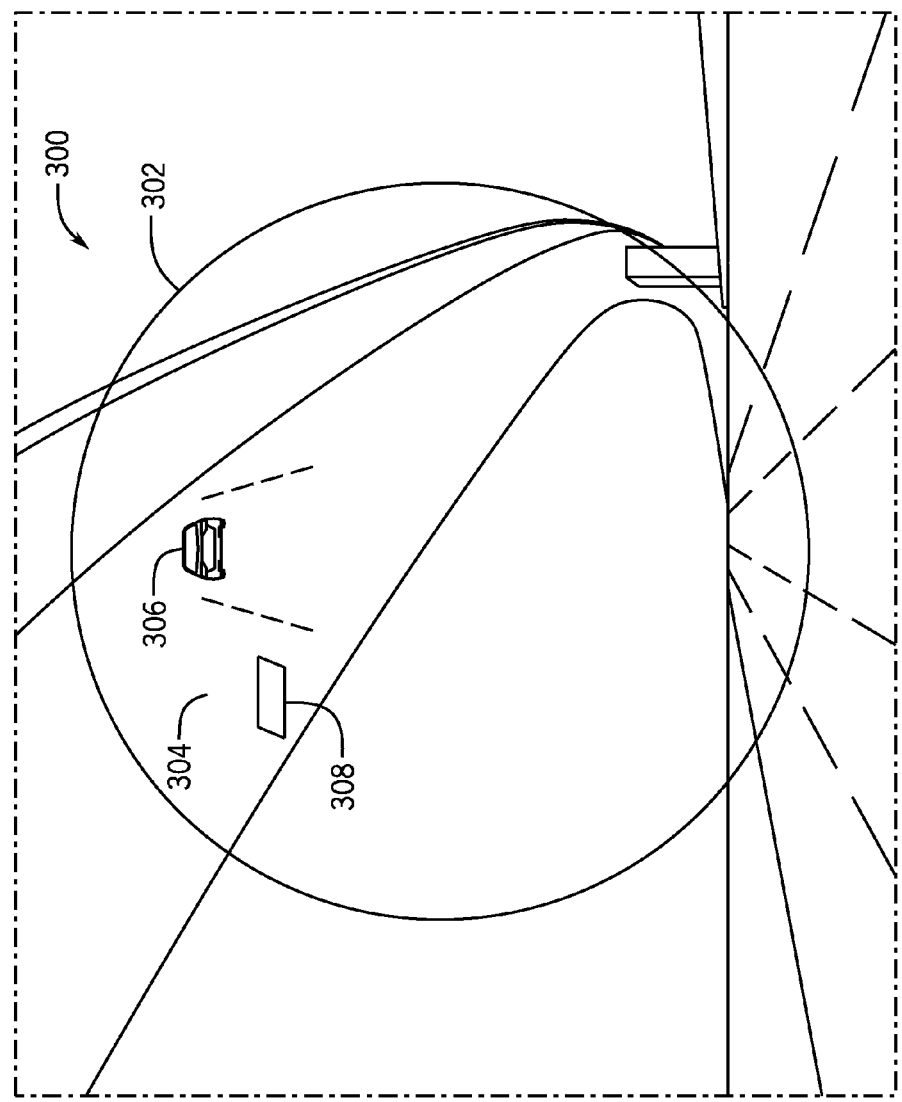

SYSTEM AND METHOD FOR PROVIDING SITUATIONAL AWARENESS IN A VEHICLE

This application claims the benefit of U.S. provisional patent application Ser. No. 62/062,640, filed Oct. 10, 2014, which is incorporated by reference in its entirety herein.

BACKGROUND

Vehicles can utilize a plurality of safety systems capable of determining safety related events that may occur within or around the vehicle. The plurality of safety systems can provide drivers with awareness or knowledge of safety related events. In many cases, the safety systems are independently operated to individually present safety warnings to the driver of the vehicle. The safety warnings can be presented various areas within the vehicle. For example, a lane assist system can present safety warnings on the side view mirrors, while a traction control system may present safety warnings on the dashboard of the vehicle. In addition, the variety of safety warnings can each be presented in a variety of different types of formats. For example, a parking assist system may utilize an audio beeping mechanism, while a safety system employs a visual warning on a display screen residing on the head unit of the vehicle. The various types of safety warnings presented throughout the vehicle can cause driver confusion.

In many cases, drivers may not realize the full extent of a safety warning that simply produces a basic visual or audio warning. For example, when the vehicle's lane assist system presents a warning light to indicate that another vehicle is potentially in the blind spot of the vehicle, the driver may not realize the exact location of the other vehicle or if there are other vehicles close to the vehicle being detected by the lane assist system. Such information can be useful to determine if the driver needs to modify his/her driving style in certain driving situations (e.g., in order to change the lane to make an exit). Therefore, without additional guidance with respect to the situational awareness of the surrounding environment of the vehicle, the driver can be distracted while manually attempting to determine the situation with respect to the surrounding environment of the vehicle.

BRIEF DESCRIPTION

According to one aspect, a method for providing situational awareness in a vehicle is provided. The method may include receiving environmental sensor data and vehicle performance sensor data. The method may also include compiling the environmental sensor data and the vehicle performance data. The method may additionally include determining one or more situational risks that are posed to the vehicle that occur within the surrounding environment of the vehicle based on the compiled environmental sensor data and the vehicle performance data. The method may further include generating one or more projected graphical objects that represent a one or more situational risks that are determined to be posed to the vehicle.

According to another aspect, a system for providing for providing situational awareness in a vehicle is provided. The system may include a situational awareness subsystem that provides situational awareness of a surrounding environment of the vehicle. The system may also include a sensor data compiling module of the situational awareness subsystem that receives environmental sensor data and vehicle performance data. The sensor data compiling module may compile the environmental sensor data and the vehicle performance data. Additionally, the system may include a situational awareness assessment module of the situational awareness subsystem that determines one or more situational risks that are posed to the vehicle that occur within a surrounding environment of the vehicle based on the compiled environmental sensor data and the vehicle performance data. The system further may include a situational awareness presentation module that generates one or more projected graphical objects that represent the one or more situational risks that are determined to be posed to the vehicle.

According to still another aspect, a computer readable medium is provided having instructions that when executed by a processor executes a method for providing augmented reality based directions. The instructions may include receiving environmental sensor data and vehicle performance sensor data. The instructions may also include compiling the environmental sensor data and the vehicle performance data. The instructions may additionally include determining one or more situational risks that are posed to the vehicle that occur within a surrounding environment of the vehicle based on the compiled environmental sensor data and the vehicle performance data. The instructions may further include generating one or more projected graphical objects that represent the one or more situational risks that are determined to be posed to the vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 3E is an illustrative example of a projected display from the HUD showing the rear fan including format of the floor zone that does not include an outline according to an aspect of the present application.

DETAILED DESCRIPTION

Figure 1:
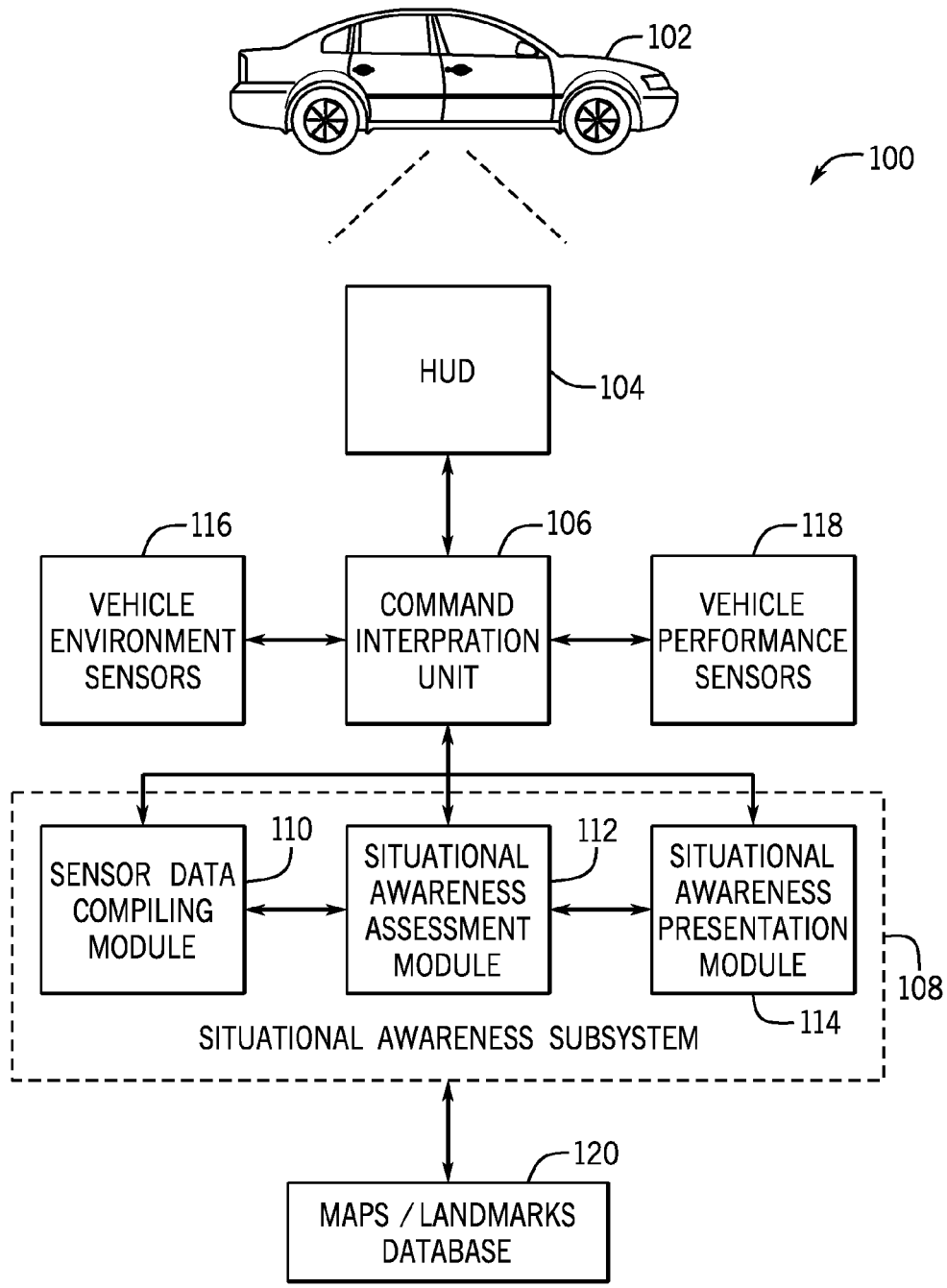
FIG. 1 is a schematic view of a system for providing situational awareness in a vehicle according to an exemplary embodiment according to an aspect of the present application.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system", as used herein can include, but is not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "vehicle occupant", as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

A "wearable computing device", as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones, personal wellness devices, collars, and leashes.

Referring now to the drawings, wherein the showings are for purposes of illustrating one or more exemplary embodiments and not for purposes of limited the same, FIG. 1 is a schematic view of a system for providing situational awareness in a vehicle according to an exemplary embodiment. The system, which may also be referred to as a driver situational awareness system, is generally designated by reference numeral 100. The components included within the system 100 may be interconnected via one or more system buses. It will be understood that FIG. 1 constitutes, in some respects, an abstraction and that the actual organization of the components of the system 100 may be more complex than illustrated. As used herein, the term "subsystem" may refer to both co-resident subsystems (e.g., subsystems that utilize the same processor or other hardware as another subsystem) and external subsystems (e.g., subsystems that utilize hardware that is separate from other subsystems). In one embodiment, the system 100 is centered around a reference vehicle 102 that can include a heads up display system (HUD) 104.

In an exemplary embodiment, the HUD 104 of the reference vehicle 102 can be in the form of a fix mounted projection volumetric heads up display that can be housed in a dashboard enclosure (not shown) of the reference vehicle 102. In an alternate embodiment, the HUD 104 can be included as part of a head mounted display that moves with the orientation of the driver's head. The HUD 104 can present the one or more projected graphical objects that can be positioned spatially and contextually on a windshield of the reference vehicle 102. In some cases the projected graphical objects can include augmented reality graphical elements. For instance, the HUD 104 can allow the rendering of contact-analog augmented reality graphic elements (i.e., three dimensional graphic elements) into the same space as the real environment as seen by the driver through the windshield of the reference vehicle 102.

In one embodiment, the HUD 104 can present information typically displayed on the head unit of the reference vehicle 102, such as information related to the vehicle's speed, fuel level, engine temperature, etc. Additionally, the HUD 104 can also present map information and communication events (e.g., navigation instructions, warnings and alerts, etc.) to the driver of the reference vehicle 102. The HUD 104 can present the information to the driver in a manner similar to that employed by the dashboard of the reference vehicle 102, such as by displaying graphic elements on the windshield of the reference vehicle 102.

The system 100 additionally includes a command interpretation unit 104 that can translate input information from virtually any group of "input" systems/subsystems into instructions for virtually any group of "output" systems/subsystems, such as the HUD 104. The various subsystems disclosed are examples illustrating the various utilities of the command interpretation unit 106 and are not intended to be limiting. The command interpretation unit 106 can receive data inputs, generate data outputs, and subsequently translate the generated data outputs into system instructions to display one or more projected graphical objects to the HUD 104.

The command interpretation unit 106 can receive input from a situational awareness display subsystem 108. The situational awareness subsystem 108 can generate and output a plurality of projected graphical objects that include a graphically generated graphical virtual 'rear fan' object (rear fan) (not shown in FIG. 1). In an exemplary embodiment, the plurality of projected graphical objects can represent other objects that are located in the surrounding environment of the reference vehicle 102 and that are moving relative to the reference vehicle 102. Additionally, the plurality of projected graphical objects generated by the situational awareness subsystem 108 can represent one or more situational risks (e.g., driving hazards) that are taking place in the surrounding environment of the reference vehicle 102. In other words, the rear fan can be presented in order to provide the driver with situational awareness of where other vehicles are located relative to the reference vehicle along with potential driving situational safety risks that can be present within the surrounding environment of the reference vehicle 102.

In an exemplary embodiment, the situational awareness subsystem 108 can identify one or more situational risks as proactive measures in order for the driver of the reference vehicle 102 to apply preventative measures when driving the reference vehicle 102. Situational risks can include, but are not limited to, other vehicles following closer than a predetermined distance ahead, behind, or to the side of the reference vehicle 102, other vehicles located in the blind spot of the driver of the reference vehicle 102, other vehicles that are approaching the reference vehicle 102 in a high rate of speed, objects that can come into the path of the reference vehicle 102 (e.g., construction cones, road debris), hazardous road conditions (e.g., potholes), inclement weather conditions (e.g., icy roads), hazardous operation of the reference vehicle 102 within the surrounding environment, etc.

In an exemplary embodiment, the rear fan and projected graphical objects included on the rear fan can be generated by the situational awareness subsystem 108 and output to the command interpretation unit 106. The command interpretation unit 106 can send one or more instructions to the HUD 104 in order to project the rear fan and additional projected graphical objects on the windshield of the reference vehicle 102 to be presented to the driver of the reference vehicle 102 via the HUD 104.

As described in more detail below, the rear fan can present (e.g., project, provide, render, etc.) the driver with a graphical depiction of one or more zones of interest. The zones of interest can include a modifiable determined environment (e.g., a definable space) that depicts the surrounding environment of the reference vehicle 102 in which other objects (e.g., vehicles, substances, pedestrians, etc.) can be located.

Although examples of the rear fan described herein can be presented to the driver of the reference vehicle 102, in some embodiments, the rear fan can be presented within view of one or more other occupants of the reference vehicle 102, such a passengers, etc. To this end, examples described herein are not intended to be limiting, and are merely disclosed to illustrate one or more exemplary aspects of the instant application.

Figure 2:
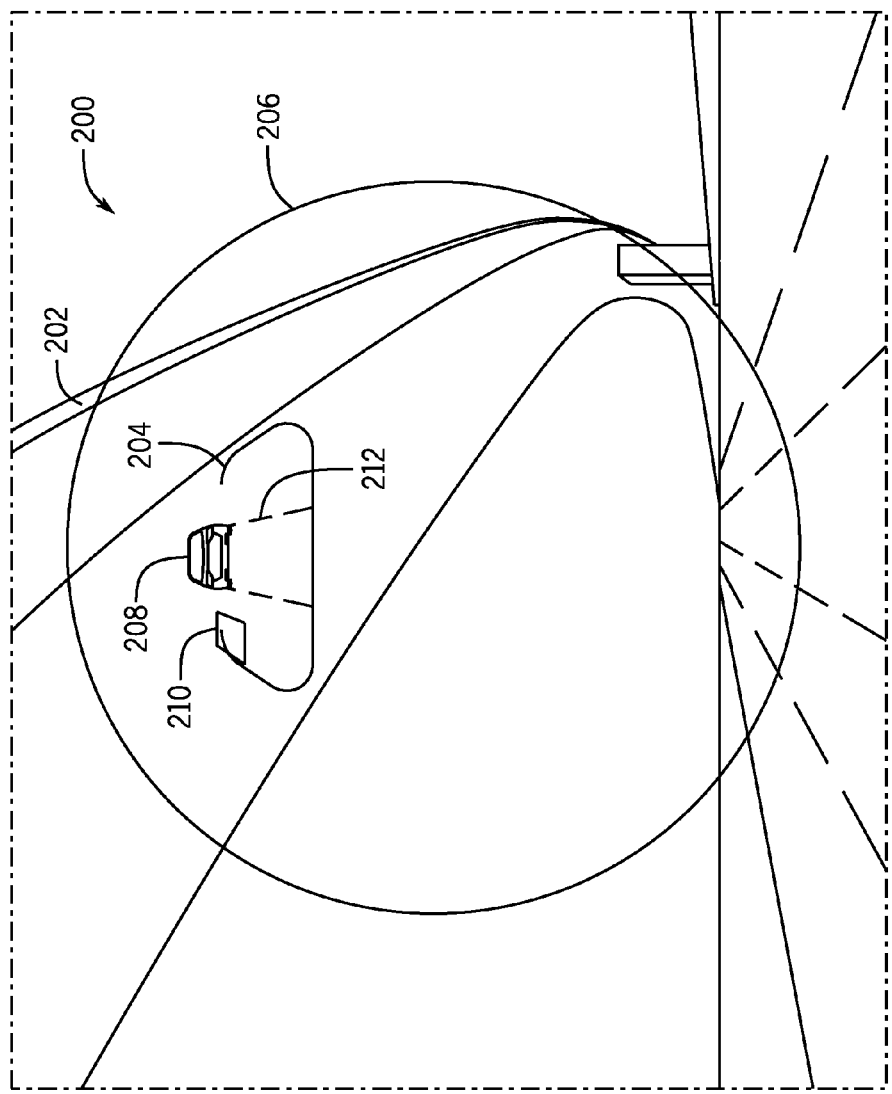
FIG. 2 is an illustration of a projected display from a HUD showing a rear fan in an exemplary default format according to an aspect of the present application.

With reference to FIG. 2, an illustration of a projected display 200 from the HUD 104 showing the rear fan 202 in an exemplary default format according to an exemplary embodiment is illustrated. In one embodiment, the rear fan 202 can be presented to the driver of the reference vehicle 102 by being projected by the HUD 104 on the upper center portion of the windshield of the reference vehicle 102 in order to avoid overlap of other objects in view of the driver. However, in other embodiments, the rear fan 202 can be projected at other locations of the windshield (e.g., bottom left, top left, etc.) The rear fan 202 can include a virtual floor zone of interest (floor zone) 204 and a virtual Doppler zone of interest (Doppler zone) 206.

The floor zone 204 can include an outline and can present the driver of the vehicle 102 with a depiction of the reference vehicle 208 on a respective area of floor zone 204 that represents the surrounding environment in which the reference vehicle 102 is being driven. Additionally, the floor zone 204 can present a depiction of one or more objects that are surrounding the reference vehicle 208. In some embodiments, the floor zone 204 is only presented as part of the rear fan based on the determination of certain types of situational risks that are present within the surrounding environment of the reference vehicle 102. However, in some embodiments, the floor zone 204 is always presented to the driver when the rear fan is presented on the HUD 104.

As shown in FIG. 2, the floor zone 204 shows the space (e.g., a surrounding environment) surrounding the sides and rear of the reference vehicle 208 within a certain distance of the reference vehicle 208. However, the floor zone 204 can present objects that appear on the front, sides and rear of the reference vehicle 208 in order to present one or more situational risks to the driver of the reference vehicle 102. In addition, the floor zone includes projected graphical objects 212 in the form of lines that can depict the environment in which the reference vehicle 102 is being driven. As shown, the reference vehicle 102 is driven on a highway and the projected graphical objects 212 depict lane markers of the highway. As will be described in more detail below, the floor zone 204 can be presented in different extended or reduced formats (e.g., scaled up or scaled down) depending on certain determined factors including situational risks that are determined to occur at specific areas within the surrounding environment of the vehicle 102. The floor zone 204 can include one or more graphical projected objects that depict other vehicles that are present within the surrounding environment of the reference vehicle 102 in order to provide the driver of the reference vehicle 102 with indication of situational risks. The other vehicles being shown can include vehicles that are located within the surrounding environment of the reference vehicle 102 and vehicles that can pose a situational risk to the reference vehicle 102. For purposes of this application, another vehicle that poses a situational risk to the reference vehicle 102 will be referred to as a hazardous vehicle. In the embodiment shown in FIG. 2, the hazardous vehicle 210 that is present within the blind spot of the driver of the reference vehicle 102 and is therefore determined to pose a situational risk to the reference vehicle 102. The hazardous vehicle 210 is presented as a rectangle to disclose an exemplary aspect, however, the hazardous vehicle 210 can be represented in a variety of different formats.

The Doppler zone 206 can include an outline that provides one or more projected graphical objects that are graphically overlaid upon an area that can be seen by the driver through the windshield of the reference vehicle 102. In some embodiments, the Doppler zone 206 is only presented as part of the rear fan based on the determination of certain types of situational risks that are present within the surrounding environment of the reference vehicle 102. However, in some embodiments, the Doppler zone 206 is always presented to the driver when the rear fan is presented on the HUD 104.

Specifically, the Doppler zone 206 can represent an overhead outline of a predetermined region (e.g., circular region) around the reference vehicle 102. One or more projected generated objects can be presented within the Doppler zone 206 based on objects that are determined at specific locations surrounding the reference vehicle 102. For example, if another vehicle is approaching the reference vehicle 208 from the rear right side, the projected graphical object representing the other vehicle can be shown within a respective area of the Doppler zone 206 in order to make the driver of the reference vehicle 102 aware of the other vehicle.

Referring back to FIG. 1, the situational awareness subsystem 108 can be implemented as an independent hardware device that includes a processor, memory, storage, or other hardware. The situational awareness subsystem 108 can include one or more modules that include a sensor data compiling module 110, a situational awareness assessment module 112, and a situational awareness presentation module 114.

The modules 110-114 that will be individually discussed in more detail below can collectively input environmental and vehicle performance factors in order to determine one or more objects located within the surrounding environment of the reference vehicle 102 that can include situational risks that can be posed to the reference vehicle 102. The situational awareness subsystem 108 can provide one or more safety features that can dictate the types of situational risks that are determined and represented on the rear fan. The one or more situational safety features provided by the situational awareness subsystem 108 can include but are not limited to a blind-spot monitoring feature, a parking assist feature, a weather warning feature, a rear crash avoidance feature, a lane change assistance feature, a collision mitigation feature, a collision warning feature, an adaptive cruise control feature, etc. The situational awareness subsystem 108 can generate the rear fan to include one or more projected graphical objects that represent a subset of the situational safety features or a combination of the situational safety features and/or additional functions.

In one or more embodiments, the situational awareness subsystem 108 can include a user interface (not shown) that receives inputs from the driver through an input terminal (e.g., a head unit touch screen display) (not shown). The driver can utilize the user interface to selectively enable or disable the entire rear fan or partial aspects of the rear fan such as the floor zone or the Doppler zone. The driver can also utilize the user interface to selectively enable or disable one or more formats of the rear fan. Additionally, the driver can utilize the user interface to selectively enable or disable one or more situational safety features provided by the situational awareness subsystem 108 that can be taken into account when determining one or more situational risks. For example, the driver can disable a lane assist feature provided on the rear fan to assist the driver when he/she is changing lanes. The disabling of such a feature can result in the situational awareness subsystem 108 bypassing the generation of projected graphical objects depicting hazardous vehicles that are located adjacent to the reference vehicle 102 on the rear fan.

Referring again to the reference vehicle 102 and its components, the reference vehicle 102 can additionally include vehicle environment sensors 116 and vehicle performance sensors 118. The vehicle environment sensors 116 can include one or more sensors (individual sensors not shown) that include, but are not limited to, radar sensors, laser sensors, infrared sensors, ultrasonic sensors, day light sensors, temperature sensors, and the like that are displaced at various locations around the reference vehicle 102. The vehicle environment sensors 116 can also include one or more cameras (not shown) that are mounted throughout the reference vehicle 102. The one or more cameras can include associated hardware configured to analyze image or video data received therefrom to identify objects in the surrounding environment of the reference vehicle 102. Various alternate or additional hardware devices will be apparent for inclusion as vehicle environment sensors 116.

The vehicle environment sensors 116 can provide one or more components, systems, and sub-systems of the reference vehicle 102 with data that pertains to the presence of objects, the attributes of objects, the conditions of the road, the lighting conditions, the weather conditions, etc. that are included within the surrounding environment of the reference vehicle 102. In one example, the vehicle environment sensors 116 can be utilized by the situational awareness subsystem 108 and other vehicle subsystems (not shown) to provide the distance between the reference vehicle 102 and other objects (e.g., other vehicles) that are located within the surrounding environment of the reference vehicle 102 in order to provide the various aforementioned situational safety features. Additionally, the vehicle environment sensors 116 can provide descriptive data that pertains to the attributes of the objects with respect to the reference vehicle 102. For example, the speed, directional path, size, and shape of another vehicle can be determined by the utilization of the vehicle environment sensors 116 in order for the situational awareness subsystem 108 to provide corresponding projected graphical objects on the rear fan. In some embodiments, the vehicle environment sensors 116 can be utilized by individual safety systems (not shown) such as a lane-assist system, blind-spot monitoring system, reverse assist system, a parking assist system, etc. to provide specific safety warnings to driver.

The vehicle performance sensors 118 can include one or more sensors that (individual sensors not shown), that include, but are not limited to, speed sensors, brake sensors, steering angle sensors, turn signal sensors, engine speed sensors, power train sensors, etc. Various alternate or additional hardware devices will be apparent for inclusion as vehicle performance sensors 118. The vehicle performance sensors 118 can provide one or more components, systems, and sub-systems of the reference vehicle 102 with data that pertains to the inherent performance and operation of the reference vehicle 102. In one example, the vehicle performance sensors 118 can be utilized by the situational awareness subsystem 108 and other vehicle subsystems (not shown) to determine inherent driving attributes of the reference vehicle 102.

In an exemplary embodiment, the sensor data compiling module 110 of the situational awareness subsystem 108 can be configured to receive environmental sensor data from the vehicle environment sensors 116 and vehicle performance data from the vehicle performance sensors 118. Specifically, the vehicle environment sensors 116 and the vehicle performance sensors 118 can send one or more data signals to the sensor data compiling module 110.

In one embodiment, the sensor data compiling module 110 can also be configured to directly communicate with external sources to obtain the supplemental data in order to supplement the received environmental sensing data and vehicle performance data with additional details. For example, the sensor data compiling module 110 can utilize a communication unit (not shown) of the reference vehicle 102 to download data from an externally hosted web traffic databases, electronic control units of other vehicles, web based weather services, web-based traffic services, etc. through a wireless communications platform, to determine the characteristics of other vehicles and/or the overall surrounding environment of the vehicle 102.

In one or more embodiments, the sensor data compiling module 110 can compile various inputs from various vehicle environment sensors 116, vehicle performance sensors 118, and external sources that are simultaneously provided to the sensor data compiling module 110 into situational awareness sensing data. The situational awareness sensing data can include data the provides the situational awareness subsystem 108 with a holistic picture of the location and characteristics of objects located in the surrounding environment of the reference vehicle 102, the characteristics of the surrounding environment of the reference vehicle 102, and the driving attributes of the reference vehicle 102 all captured at a single point in time. The sensor data compiling module 110 can be configured to provide the situational awareness sensing data to the situational awareness assessment module 112 of the situational awareness subsystem 108 in order to be analyzed, as described in more detail below.

In an exemplary embodiment, the situational awareness assessment module 112 can be configured to receive, compute, and analyze the situational awareness sensing data in order to determine the existence and characteristics of one or more objects (e.g., other vehicles) that are located within the surrounding environment of the reference vehicle 102. In addition, the situational awareness assessment module 112 can be configured to determine if one or more of the objects that are located within the surrounding environment of the reference vehicle 102 pose situational risks to the reference vehicle 102 (e.g., hazardous vehicles).

Specifically, the situational awareness assessment module 112 can analyze the situational awareness sensing data to determine the location of one or more objects that are located within a certain distance of the reference vehicle 102 within the surrounding environment of the reference vehicle 102. The situational awareness assessment module 112 can also determine characteristics of those objects that are located within the surrounding environment of the reference vehicle 102. For example, the characteristics of the objects can include but are not limited to the location, size, shape, speed, range, distance and direction of travel of surrounding vehicles that are moving near the reference vehicle 102 within the surrounding environment of the reference vehicle 102. Additionally, the situational awareness assessment module 112 can determine if an object that is located within the surrounding environment of the reference vehicle 102 is another vehicle 102 or a non-moving object (e.g., road debris).

The situational awareness assessment module 112 can also be configured to analyze situational awareness sensing data with respect to the characteristics about the surrounding environment of the reference vehicle 102 in order to determine one or more situational risks. For instance, the situational awareness assessment module 112 can be configured to analyze the situational awareness sensing data and determine driving conditions with respect to weather, road conditions, temperature, traffic, visibility, road width, lane markers, and the location of non-moving objects exhibiting certain characteristics (e.g., highway signs, guard rails, construction cones/barrels).

In one or more embodiments, the situational awareness assessment module 112 can be configured to create data objects representing each sensed aspect of the environment and the performance of the reference vehicle 102 as determined from the situational awareness sensing data. Additionally, in some embodiments, the situational awareness assessment module 112 can be configured to track and retain data regarding sensed aspects of the surrounding environment and the performance of the reference vehicle 102 in order to perform additional analysis when the reference vehicle 102 is being driven in one or more specific surrounding environments.

The situational awareness assessment module 112 can be configured to analyze the situational awareness sensing data to determine one or more situational risks in order to provide one or more situational safety features of the situational awareness subsystem 108 (e.g., blind spot detection, parking assist, rear crash avoidance, etc.) on the rear fan. The situational risks that can be determined by the situational awareness assessment module 112 can include any type of safety risk that can pose a threat to the reference vehicle 102 within the surrounding environment of the reference vehicle 102. For instance, the situational awareness assessment module 112 can analyze the speed patterns, lane changing patterns, braking patterns, etc. of other vehicles that are being driven within the surrounding environment of the reference vehicle 102 in order to make determinations regarding the driving path, distance, and location of those vehicles with respect to the reference vehicle 102. The situational awareness assessment module 112 can be configured to utilize these determinations to further determine if the other vehicles pose situational risks to the reference vehicle 102 (i.e., the other vehicles are hazardous vehicles). For example, the situational awareness assessment module 112 can analyze data from the situational awareness sensing data that indicates the presence of another vehicle that is being driven at a high rate of speed 100 feet behind the reference vehicle 102 in order to determine that the other vehicle poses a situational risk to the reference vehicle 102.

Additionally, the situational awareness assessment module 112 can be configured to analyze the situational awareness sensing data to determine the inherent driving attributes of the reference vehicle 102 to further determine one or more situational risks. For instance, the situational awareness assessment module 112 can be configured to analyze the situational awareness sensing data and determine the reference vehicle's speed, braking, steering angles, wheel angle, wiper usage, head light usage, turn signal usage, etc. The situational awareness assessment module 112 can access the inherent driving attributes (e.g., the speed of the reference vehicle 102) along with additional data regarding the characteristics of the surround environment of the reference vehicle 102 as determined from the situational awareness sensing data (e.g., road conditions, etc.) in order to determine one or more situational risks that can be posed to the reference vehicle 102.

In one embodiment, in addition to utilizing the situational awareness sensing data provided by the sensor data compiling module 110, the situational awareness assessment module 112 can also be configured to access a maps/landmarks database 120 that supplies the situational awareness assessment module 112 with mapping information of the surrounding environment that includes, but is not limited to, road network data, landmark data, points of interest data, street view data, political boundary data, etc. The maps/landmarks database 120 can be accessed in order to acquire additional information that can be paired to the determined characteristics of the surrounding environment of the reference vehicle 102. In one embodiment, the maps/landmarks database 120 can be operably connected to a GPS navigation system (not shown) to provide characteristics of the surrounding environment of the vehicle 102.

In one embodiment, the mapping information can be utilized by the situational awareness assessment module 112 in order to create a virtual model of the surrounding environment of the reference vehicle 102. The virtual model can be utilized by the situational awareness assessment module 112 to proactively determine situational risks that the reference vehicle 102 can encounter within the surrounding environment of the reference vehicle 102. For example, the mapping information can include descriptive data including the existence and location of turns, off-ramps, on-ramps, toll booths, intersections, traffic patterns, objects, etc. that the reference vehicle 102 can encounter before such data maybe captured by the vehicle environment sensors 116 and included within the situational awareness sensing data.

Additionally, the mapping information can be utilized by the situational assessment module 112 to assign an environment classification of the surrounding environment of the reference vehicle 102 in which the reference vehicle 102 is traveling. The environment classification can include a descriptive classification of a specific area that the reference vehicle 102 is being driven such as a parking lot, a major highway, a residential road, and the like. As will be described below, in some embodiments, the environment classification can be utilized to generate a plurality of formats of the rear fan and projected graphical objects generated on the rear fan in order to be presented to the driver of the reference vehicle 102 via the HUD 104.

In one embodiment, the situational awareness assessment module 112 can also be configured to assign a severity score to each of the situational risks that are determined to be posed to the reference vehicle 102. The severity score can be determined based on a pre-determined scoring system that is utilized by the situational awareness assessment module 112 to classify and rank each determined situational risk based on one or more factors (e.g., the driving attributes of the reference vehicle 102, the current weather conditions, the current road conditions, etc.) For example, when the reference vehicle 102 is driven in inclement weather, one or more hazardous vehicles approaching the reference vehicle 102 at a high rate of speed can be determined to pose a situational risk(s) to the reference vehicle 102 with a higher severity score than the situational risks(s) posed by one or more hazardous vehicles that are located within the blind spot of the reference vehicle 102.

In an exemplary embodiment, the situational awareness assessment module 112 can be configured to provide situational awareness assessment data to the situational awareness presentation module 114. The situational awareness data can include data determined by the situational assessment module 112 (discussed above), that includes, but is not limited to, the characteristics of objects located within the surrounding environment of the reference vehicle 102, the characteristics of the surrounding environment of the reference vehicle 102, specific details associated with one or more determined situational risks (e.g., type of risk, type of situational safety feature that is provided by the determined risk), mapping information that pertains to any determined situational risks, the severity score that is assigned to the determined situational risks, and the environment classification of the surrounding environment in which the reference vehicle 102 is traveling. In some embodiments, the situational awareness assessment data can also contain relevant aspects of the situational awareness sensing data utilized to determine one or more situational risks.

In an exemplary embodiment, the situational awareness presentation module 114 can be configured to compute, and analyze the situational awareness assessment data received from the situational awareness assessment module 112 in order to generate a plurality of formats of the rear fan. Specifically, the situational awareness presentation module 114 can be configured to determine and generate one or more types of graphically projected objects that include the floor zone and/or Doppler zone of the rear fan and one or more graphically projected objects that are presented on the floor zone and/or the Doppler zone of the rear fan.

In an exemplary embodiment, the situational awareness presentation module 114 can analyze the situational awareness assessment data in order to provide a default format of the rear fan. The default format of the rear fan (as shown in FIG. 2) can include a predetermined scale, tilt, and outline of the floor zone and one or more projected graphical objects that are presented on the floor zone (e.g., other vehicles, lane markers, etc.). Similarly, the default format of the rear fan can include a predetermined scale, tilt, and outline of the Doppler zone and objects that are presented on the Doppler zone. In one or more embodiments, the default format of the rear fan can be generated and presented when there are no situational risks determined by the situational awareness assessment module 112. For example, when the situational awareness presentation module 114 analyzes the situational awareness assessment data and determines that there are no situational risks that are posed to the reference vehicle 102, the situational awareness presentation module 114 can generate the default format of the rear fan. Furthermore, the situational awareness presentation module 114 can generate the floor zone and/or Doppler zone with one or more projected generated objected that depict one or more vehicles that are traveling in a non-hazardous manner within the surround environment of the reference vehicle 102.

In one or more embodiments, the situational awareness presentation module 114 can modify the format of the default format of the rear fan into the plurality of formats when one or more situational risks are determined to be posed to the reference vehicle 102. Generally, the plurality of formats can include various (e.g., modifiable) types of sizes, colors, shapes, appearances, arrangements, and scales of the rear fan, the floor zone, the Doppler zone, and/or one or more projected graphical objects generated on the rear fan.

In some embodiments, the situational awareness presentation module 114 can be configured to generate projected graphical objects that portray the specific size and shape of objects (e.g., hazardous vehicles) within the surrounding environment of the reference vehicle 102 deemed to pose situational risks to the reference vehicle 102. Additionally, the range of one or more objects within the surrounding environment of the reference vehicle 102 (e.g., the distance of the object with respect to the reference vehicle 102) as determined from the situational awareness assessment data can be utilized by the situational awareness presentation module 114 to generate one or more projected graphical objects at specific locations of the floor zone and/or the Doppler zone of the rear fan.

In an exemplary embodiment, the situational awareness presentation module 114 can also be configured to generate the floor zone and/or Doppler zone in a manner that is modified to be extended or reduced from a default presentation (e.g., scaled up or scaled down) based on the determination of one or more situational risks and data pertaining to the one or more situational risks (e.g., severity score of the situational risk(s)) as determined from the situational awareness assessment data. Specifically, the floor zone can be extended to show situational risks that are determined a certain distance behind or ahead of the reference vehicle 102 (e.g., one or more hazardous vehicles approaching the reference vehicle 102 at a high rate of speed).

Figure 3A:
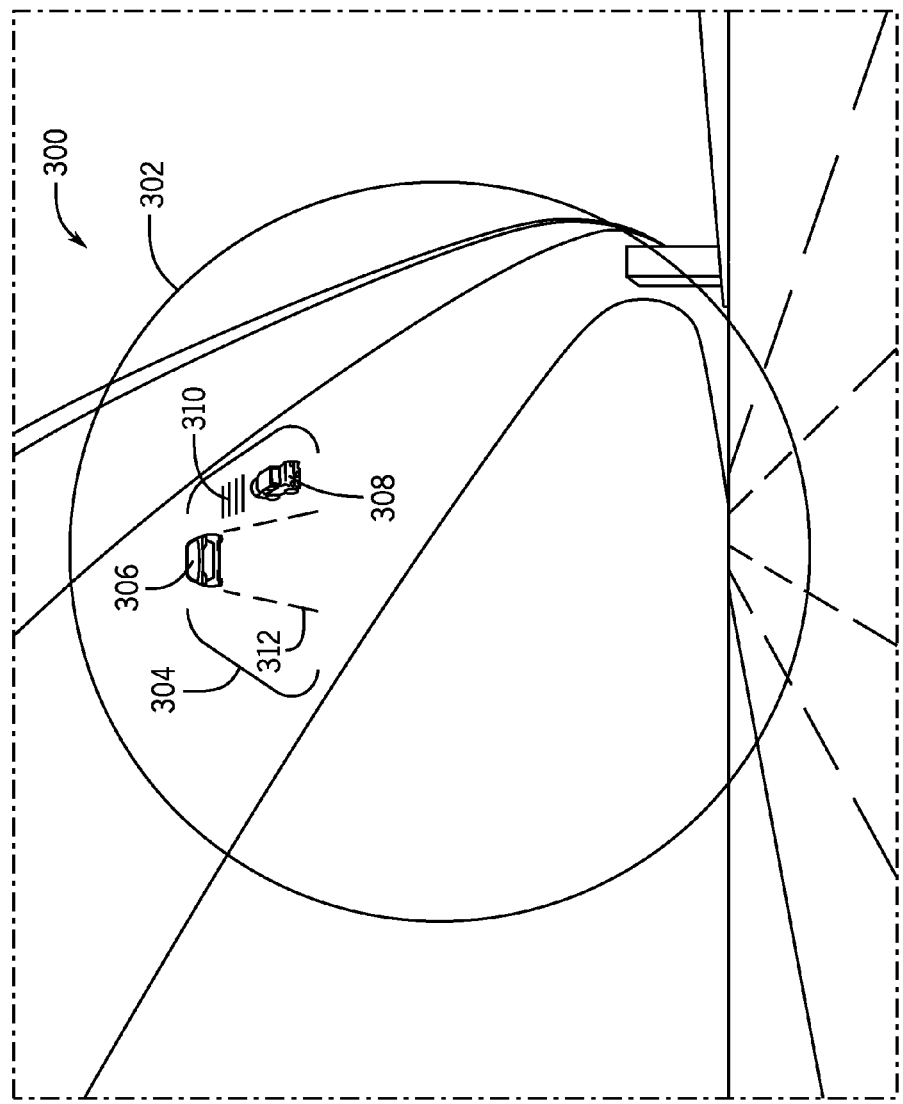
FIG. 3A is an illustrative example of a projected display from the HUD showing the rear fan including the extended format of a floor zone in an exemplary mode according to an aspect of the present application.

FIG. 3A shows an illustrative example of a projected display 300 from the HUD 104 showing the rear fan 302 including the extended format of the floor zone 304 according to an exemplary embodiment. As illustrated, the situational awareness presentation module 114 can generate the floor zone 304 of the rear fan 302 in an extended format (scaled/zoomed out) to be presented by the HUD 104 as the projected display 300. In this example, the situational awareness assessment module 112 determines that a fast approaching vehicle poses a situational risk to the reference vehicle 306 at the right hand side lane adjacent to the lane in which the reference vehicle 306 is traveling. The situational awareness presentation module 114 can generate the floor zone 304 as determined from the situational awareness assessment data. The floor zone includes projected graphical objects 312 in the form of lines that depict the lanes of the highway on which the reference vehicle 102 is being driven based on the environment classification of the surrounding environment of the reference vehicle 102 (e.g., major highway) as determined by the situational awareness assessment module 112. Additionally, the situational awareness presentation module 114 can generate the projected graphical object depicting the hazardous vehicle 308 as a generic image of a vehicle that is generated on an area of the floor zone 304 that corresponds to the location of the hazardous vehicle 308 with respect to the reference vehicle 102 within the surrounding environment of the reference vehicle 102. Various additional formats of the projected graphical object of the hazardous vehicle 308 can be generated by the situational awareness presentation module 114 and will be apparent. As illustrated, the extended format of the floor zone 304 can be generated by the situational awareness presentation module 114 in order to alert the driver of the reference vehicle 306 of the fast approaching hazardous vehicle 308 that maybe located a large distance behind the reference vehicle 102 within the adjacent right hand side lane of the reference vehicle 102.

Additionally as illustrated in the example of FIG. 3A, the situational awareness assessment module 112 determines the hazardous vehicle's projected path based on the situational awareness sensing data provided by the sensor data compiling module 110. Therefore, based on analysis of the situational awareness assessment data, the situational awareness presentation module 114 generates the projected graphical object 310 in the format of lines projected ahead of the projected graphical object depicting the projected path of the fast approaching hazardous vehicle to the driver of the reference vehicle 102. Various additional formats of the projected graphical object 310 can be generated by the situational awareness presentation module 114 and will be apparent.

Figure 3B:
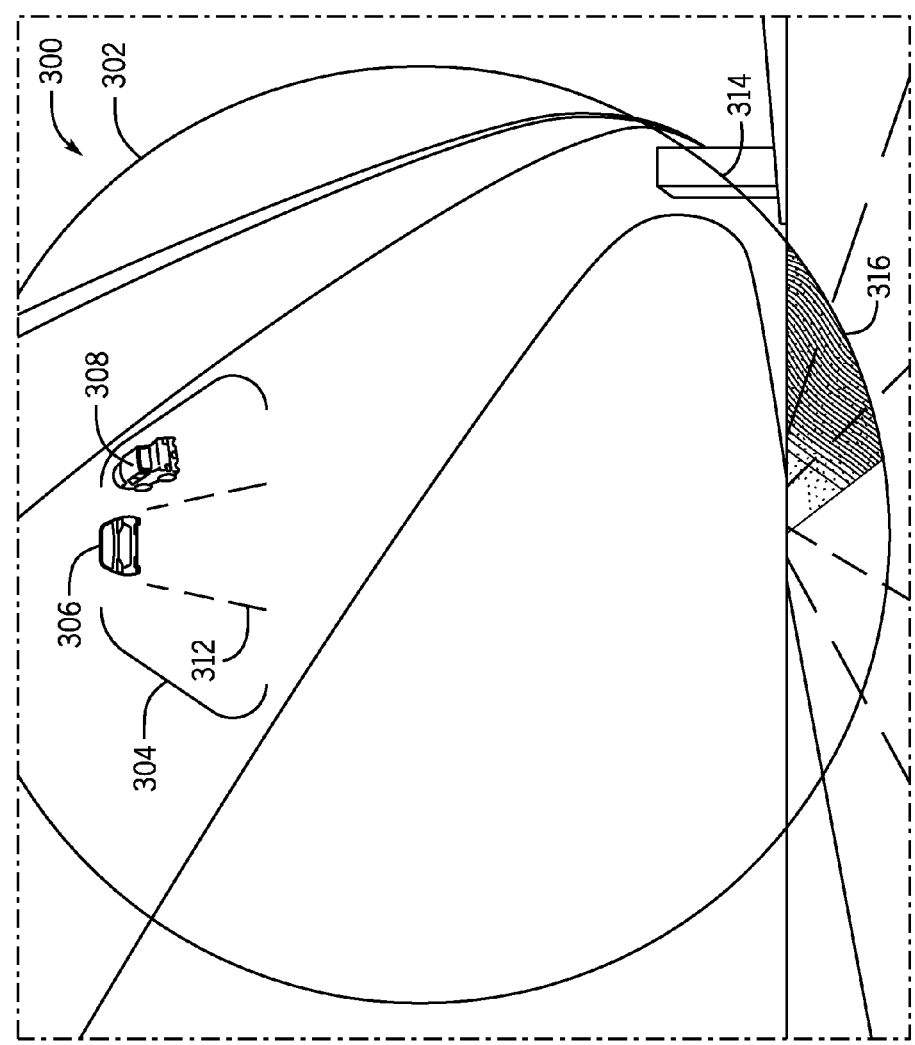
FIG. 3B is an illustrative example of a projected display from the HUD showing the rear fan including the extended format of a Doppler zone in an exemplary mode according to an aspect of the present application.

FIG. 3B shows an illustrative example of a projected display 300 from the HUD 104 showing the rear fan 302 including the extended format of the Doppler zone 314 in an exemplary mode according to an exemplary embodiment. As illustrated, the situational awareness presentation module 114 can generate the Doppler zone 314 and the floor zone 304 of the rear fan 302 in an extended format. In this example, the situational awareness assessment module 112 determines that a hazardous vehicle is located within the blind spot of the driver of the reference vehicle 102 on the right hand side lane adjacent to the lane in which the reference vehicle 102 is being driven. The situational awareness presentation module 114 can generate the projected graphical object depicting the hazardous vehicle 308 as a generic image of a vehicle that is generated on an area of the floor zone 304 that corresponds to the location of the hazardous vehicle 308 within the surrounding environment of the reference vehicle 102. Various additional formats of the projected graphical object of the hazardous vehicle 308 can be generated by the situational awareness presentation module 114 and will be apparent.

Additionally, in the illustrative example of FIG. 3B, the situational awareness presentation module 114 also generates the projected graphical object 316 depicted as a highlighted area on the bottom right portion of the Doppler zone 314 as overlaid upon the adjacent right hand side lane of the reference vehicle 306. The projected graphical object 316 depicts the approaching hazardous vehicle in order to warn the driver of the reference vehicle 306 of the hazardous vehicle located to the rear right area of the reference vehicle 102. Various additional formats of the projected graphical object 316 can be generated by the situational awareness presentation module 114 and will be apparent.

In one or more embodiments, the floor zone and/or Doppler zone can be generated in the extended or reduced format and/or one or more projected graphical objects can be generated by the situational awareness presentation module 108 based on the mapping information, and/or the environment classification as determined from the situational awareness assessment data. For example, the floor zone can be extended ahead of the reference vehicle 102 if a traffic intersection is determined to be located at predetermined distance (e.g., 500 feet) ahead of the reference vehicle 102. The traffic intersection can be depicted by a corresponding projected graphical object that is presented on the extended portion of the floor zone in order to provide situational awareness of the upcoming intersection to the driver.

In some embodiments, the situational awareness presentation module 114 can generate an extended or reduced format of the floor zone and/or the Doppler zone based on the driving attributes of the reference vehicle 102 with respect to the characteristics of the surround environment of the reference vehicle 102, as determined by the situational awareness assessment data. For example, the floor zone can be generated as extended when the reference vehicle 102 is above a predetermined speed when traveling on a highway as determined by the situational awareness assessment module 112. Additionally, the situational awareness presentation module 114 can be configured to generate the floor zone and/or Doppler zone as extended in the direction in which the reference vehicle 102 can be turning, reversing, parking, etc. based on one or more situational risks that are determined by the situational awareness assessment module 112.

Figure 3C:
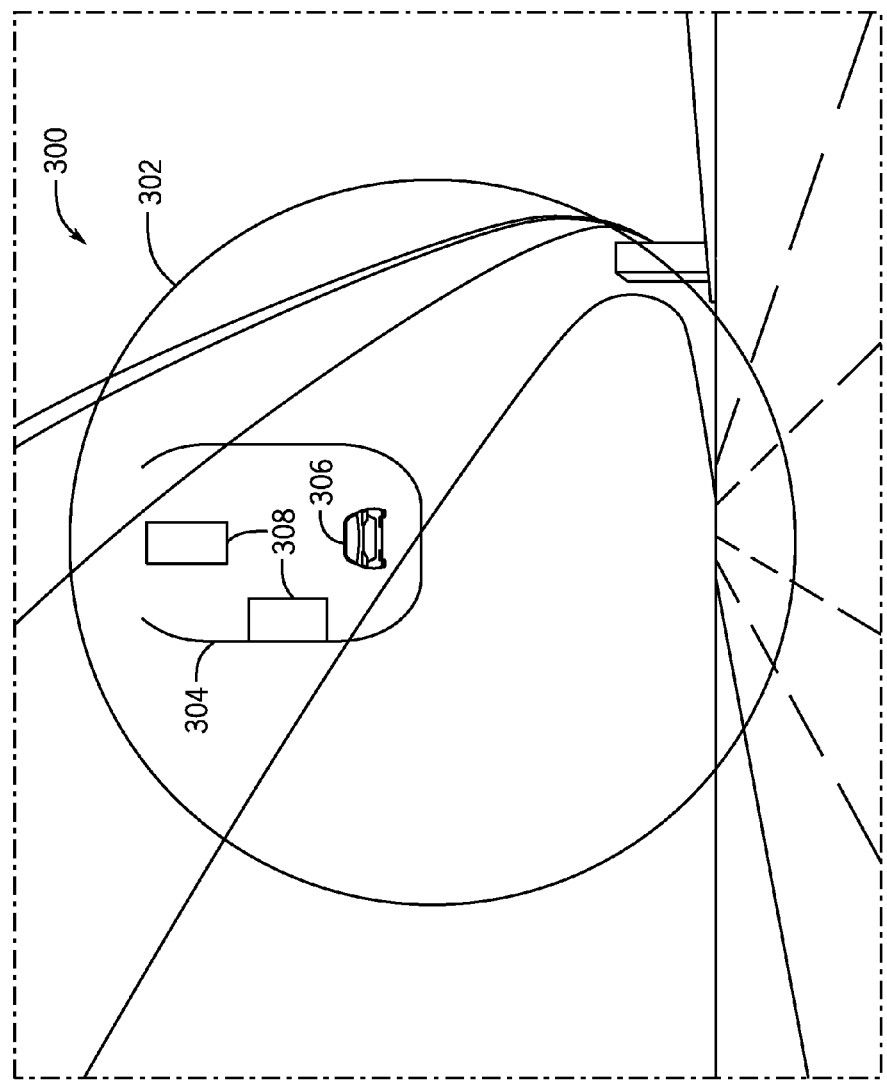
FIG. 3C is an illustrative example of a projected display from the HUD showing the rear fan including the extended format of the floor zone extended ahead of a reference vehicle in an exemplary mode according to an aspect of the present application.

In one embodiment, the floor zone and/or Doppler zone can be generated in the extended or reduced format and/or one or more projected graphical objects can be generated by the situational awareness presentation module 108 based on various environmental situational risks. FIG. 3C shows an illustrative example of a projected display 300 from the HUD 104 showing the rear fan 302 including the extended format of the floor zone 304 extended ahead of the reference vehicle 306 according to an exemplary embodiment. As shown, the floor zone 304 can be generated in extended format ahead of the reference vehicle 306 in order to depict one or more projected graphical elements that represent situational risks that are posed to the reference vehicle 306. In this example, situational awareness presentation module 108 generates the projected generated objects 308 depicting two icy patches of road that persist ahead of the reference vehicle 102. Various additional formats of the projected graphical objects 308 can be generated by the situational awareness presentation module 114 and will be apparent.

In one embodiment, the situational awareness presentation module 114 can be configured to generate one or more different formats of the floor zone of the rear fan based on the environment classification determined by the situational awareness assessment module 112. For example, the floor zone can include projected graphical objects in the form of parking lines that indicate parking spots when the surrounding environment of the reference vehicle 102 is classified as a parking lot. Similarly, the floor zone can present projected graphical objects that represent highway lane markers (as shown by the projected graphical objects 312 in FIGS. 3A and 3B) when the surrounding environment of the reference vehicle 102 is classified as a highway.

In one or more embodiments, the situational awareness presentation module 114 can be configured to generate one or more tilt formats of the rear fan as determined from the situational awareness assessment data. In one embodiment, the Doppler zone of the rear fan can be generated with projected graphical objects being presented in a two-dimensional format when certain types of situational risks are determined to be present further away from the reference vehicle 102. On the other hand, the Doppler zone of the rear fan can be generated with projected graphical objects being presented in a volumetric three dimensional format when situational risks are determined to be present within the vicinity of the reference vehicle 102.

Figure 3D:
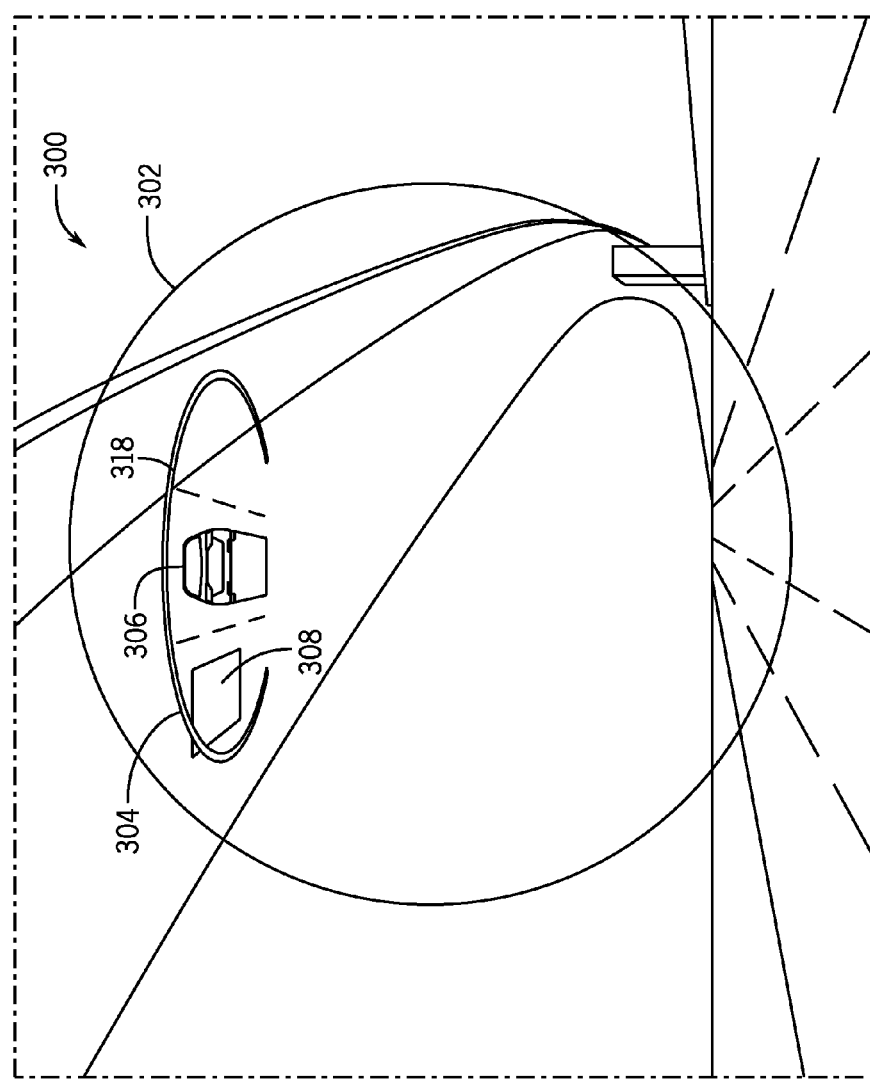
FIG. 3D is an illustrative example of a projected display from the HUD showing the rear fan including an inverted tilt format of the floor zone according to an aspect of the present application.

In one embodiment, the one or more tilt formats of the floor zone can include a modification in the direction in which the floor zone of the rear fan is presented (e.g., horizontally, vertically) based on the situational awareness assessment data and/or the preferences of the driver provided on the aforementioned user interface. FIG. 3D shows an illustrative example of a projected display 300 from the HUD 104 showing the rear fan 302 including an inverted tilt format of the floor zone 304 according to an exemplary embodiment. As shown, the format of the floor zone 304 can be presented in a reduced inverted tilt format, wherein the reference vehicle 306 and one or more projected graphical objects depicting the surrounding environment of the reference vehicle 102 and/or one or more situational risks that are posed to the reference vehicle 102 is generated underneath the floor zone 304 in a reduced format of the floor zone 304, rather than atop the floor zone 304 as presented in the default format (e.g., as shown in FIG. 2).

In other embodiments, the situational awareness presentation module 114 can be configured to generate modifiable formats of the outline of the floor zone and/or the Doppler zone as determined from the situational awareness assessment data and/or the preferences of the driver provided on the aforementioned user interface. The one or more formats of the outline can be generated in a variety of colors, shades, outlines, widths, and levels of visibility. For example, the format of the outline of the floor zone can be generated to be modified to a bright red color when a situational risk that is classified with a high severity score is determined to be posed to the reference vehicle 102. Referring again to FIG. 3D, the format of the outline 318 of the floor zone 304 can be modified from the default shape (shown in FIG. 2) to a modified circular shape based on the driver's preference and/or the determination of one or more situational risks. FIG. 3E shows an illustrative example of a projected display 300 from the HUD 104 showing the rear fan 302 including format of the floor zone 304 that does not include an outline. As shown, the floor zone 304 can be generated without the outline as determined by the situational awareness assessment data and/or the preferences of the driver provided on the aforementioned user interface.

In one or more embodiments, the situational awareness presentation module 114 can be configured to generate modifiable formats of one or more projected graphical objects generated on the floor zone and/or Doppler zone of the rear fan. Specifically, the one or more projected graphical objects can be presented in a variety of shapes, sizes, colors, color grades, and representations based on objects determined within the surrounding environment of the reference vehicle 102 and the characteristics determined of the surrounding environment of the reference vehicle 102. For example, another vehicle determined to be located within the surrounding environment of the reference vehicle 102 can be generated as a while rectangle, until that vehicle is determined to be a hazardous vehicle that poses a situational risk to the reference vehicle 102. In one example, the hazardous vehicle can be generated as a red flashing triangle in order to attract the driver's attention of the situational risk that the hazardous vehicle poses to the reference vehicle 102. In another example, debris that is determined to be located ahead of the reference vehicle 102 on the roadway that poses a situational risk to the reference vehicle 102 can be generated as a solid black box within the extended format of the floor zone.

As discussed, in some embodiments, the situational awareness presentation module 114 can selectively generate the floor zone and/or the Doppler zone of the rear fan based on the certain types of situational risks as determined from the situational awareness assessment data and/or the preferences of the driver provided on the aforementioned user interface. For instance, the situational awareness presentation module 114 may only generate the Doppler zone of the rear fan when a specific type of situational risk is determined to be posed to the reference vehicle 102. Many other non-limiting embodiments of the generation of the plurality of formats of the rear fan by the situational awareness presentation module 114 will be apparent.

In an exemplary embodiment, upon generating the rear fan that includes one or more projected graphical objects (including the floor zone and/or the Doppler zone) in one of the plurality of formats, the situational awareness presentation module 114 can send one or more signals to the command interpretation unit 106 in order to present the generated rear fan via the HUD 104. The command interpretation unit 106 can be configured to provide instructions to the HUD 104 according to virtually any method of inter-system communication. For example, the command interpretation unit 106 can generate instruction messaging having a format known to be understood by the HUD 104. Upon receiving the instructions, the HUD 104 can project the rear fan with one or more projected graphical objects in the format as generated by the situational awareness presentation module 114 in order to provide the driver of the reference vehicle 102 with situational awareness of the surrounding environment of the reference vehicle 102.

Figure 4:
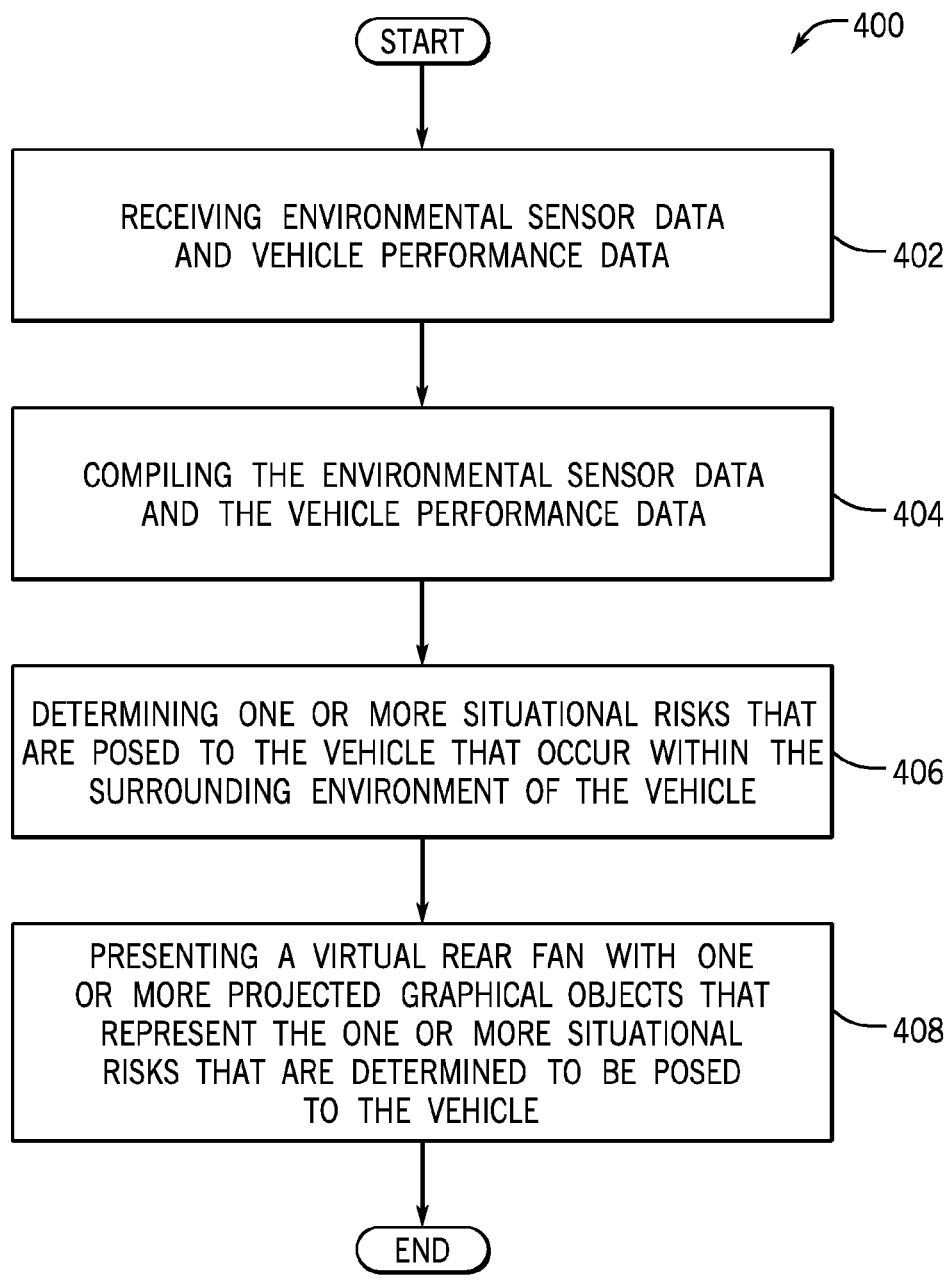
FIG. 4 illustrates an exemplary method of the driver situational awareness system for providing situational awareness in the reference vehicle according to an aspect of the present application.

FIG. 4 illustrates an exemplary method 400 of the driver situational awareness system 100 for providing situational awareness in the reference vehicle 102. The method 400 will be described herein in association with the operating environment of FIG. 1, though this is not required. The exemplary method 400 is an overview of the process utilized by the situational awareness subsystem 108 to generate the rear fan with one or more projected graphical objects. At block 402, the method includes receiving environmental sensor data and vehicle performance data. In an exemplary embodiment, the situational awareness subsystem 108 receives environmental sensing data from the vehicle environment sensors 116 and vehicle performance sensing data from the vehicle performance sensors 118.

At block 404, the method includes compiling the environmental sensor data and the vehicle performance data to determine the driving situation of the vehicle. In one embodiment, the vehicle environment sensors 116 and the vehicle performance sensors 118 can send one or more data signals to the sensor data compiling module 110 of the situational awareness subsystem 108. Upon receipt of the one or more data signals the sensor data compiling module 110 compiles the data signals to determine the driving situation of the reference vehicle 102. In an exemplary embodiment, the sensor data compiling module 110 can compile various inputs from various vehicle environment sensors 116, vehicle performance sensors 118, and external sources that are simultaneously provided to the sensor data compiling module 110 into situational awareness sensing data. Additionally, the sensor data compiling module 110 can provide the sensor awareness sensing data to the situational awareness assessment module 112.

At block 406, the method includes determining one or more situational risks that are posed to the vehicle that occur within the surrounding environment of the vehicle. In one embodiment, the situational awareness assessment module 112 can analyze the situational awareness sensing data provided by the sensor data compiling module 110 to determine characteristics of one or more objects located within the surrounding environment of the reference vehicle 102, the characteristics of the surround environment of the reference vehicle 102, and/or the driving attributes of the reference vehicle 102. The situation awareness assessment module 112 can determine one or more situational risks that are posed to the reference vehicle 102 within the surrounding environment of the reference vehicle 102.

As discussed the situational awareness assessment module 112 can access the maps/landmarks database 120 in order to obtain mapping information of the surrounding environment of the reference vehicle 102. Additionally, the situational awareness assessment module 112 can assign an environment classification of the surrounding environment of the vehicle 102 and a severity score to one or more situational risks that are determined. The situational awareness assessment module 112 can package the determined data regarding into situational awareness assessment data. Additionally, the situational awareness assessment module 112 can provide the situational awareness assessment data to the situational awareness presentation module 114.

At block 408, the method includes generating a virtual rear fan with one or more projected graphical objects that represent the one or more situational risks that are determined. In an exemplary embodiment, the situational awareness presentation module 114 can be configured receive, compute, and analyze the situational awareness assessment data in order to generate a plurality of formats of the rear fan. Specifically, the situational awareness presentation module 114 can be configured to determine and generate one or more types of graphically projected objects that include the floor zone and/or Doppler zone of the rear fan and one or more graphically projected objects that are presented on the floor zone and/or the Doppler zone of the rear fan. As discussed the situational awareness presentation module 114 can also generate the plurality of formats of the rear fan to be presented to the driver of the reference vehicle 102 via the HUD 104. The plurality of formats can generally include, but are not limited to, generating one or more formats of the floor zone and the Doppler zone, generating the floor zone and the Doppler zone to be in the extended or reduced format, generating the outline of the floor zone to be modified, generating one or more tilt orientations of the rear fan, generating the floor zone to represent one more environments in which the vehicle is being driven, etc. Additionally, the plurality of formats generated by the situational awareness presentation module 114 can include a plurality of formats of one or more projected graphical objects that include modifying the size, color, shape, appearance, arrangement, and scale of the one or more projected graphical objects.

As discussed above, various embodiments of the driver situational awareness system 100 can be utilized for providing situational awareness in the reference vehicle 102. In addition, numerous components and technologies that have not been discussed herein can be utilized to compute operations associated with the situational awareness subsystem 108.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules or other data. Non-transitory computer readable storage media excludes transitory and propagated data signals.

It can be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

The invention claimed is:

1. A computer-implemented method for providing situational awareness in a vehicle comprising:
   receiving environmental sensor data and vehicle performance data;
   compiling the environmental sensor data and the vehicle performance data;
   determining one or more situational risks that are posed to the vehicle that occur within a surrounding environment of the vehicle based on the compiled environmental sensor data and the vehicle performance data; and
   generating one or more projected graphical objects that represent the one or more situational risks that are determined to be posed to the vehicle, wherein generating the one or more projected graphical objects that represent the one or more situational risks includes analyzing situational awareness assessment data and generating a virtual rear fan object (rear fan) that includes a virtual floor zone of interest (floor zone) and a virtual Doppler zone of interest (Doppler zone), wherein the floor zone and the Doppler zone includes the one or more projected graphical objects that represent at least one of: one or more objects determined within the surrounding environment of the vehicle, determined characteristics of the surrounding environment of the vehicle, and determined situational risks that are posed to the vehicle.

2. The computer-implemented method of claim 1, wherein compiling the environmental sensor data and the vehicle performance data includes compiling a plurality of inputs that are simultaneously provided from one or more vehicle environment sensors, one or more vehicle performance sensors, and one or more external sources into situational awareness sensing data.

3. The computer-implemented method of claim 2, wherein determining one or more situational risks that are posed to the vehicle includes analyzing the situational awareness sensing data and determining characteristics of at least one of: the one or more objects determined within the surrounding environment of the vehicle, and inherent driving attributes of the vehicle.

4. The computer-implemented method of claim 2, wherein determining one or more situational risks that are posed to the vehicle includes assigning an environment classification to the surrounding environment of the vehicle and a severity score to one or more determined situational risks that are posed to the vehicle, wherein the environment classification includes a classification of the surrounding environment of the vehicle and the severity score includes a score that is assigned to each determined situational risk that is posed to the vehicle.

5. The computer-implemented method of claim 1, wherein generating the one or more projected graphical objects that represent the one or more situational risks includes analyzing the situational awareness assessment data and generating one or more formats of the floor zone and the Doppler zone, wherein generating one or more formats includes at least one of: generating the floor zone to be in an extended format, generating the floor zone of the Doppler zone to be in the extended format, generating the floor zone to be in a reduced format, generating the Doppler zone to be in a reduced format, generating the outline of the floor zone to be modified, generating the floor zone to represent one more environments in which the vehicle is being driven.

6. The computer-implemented method of claim 5, wherein generating the one or more projected graphical objects that represent the one or more situational risks includes analyzing the situational awareness assessment data and generating a plurality of formats of the one or more projected graphical objects, wherein generating different formats of the one or more projected graphical objects include modifying at least one of: size, color, shape, appearance, arrangement, and scale of the one or more projected graphical objects.

7. The computer-implemented method of claim 5, wherein generating the one or more projected graphical objects that represent the one or more situational risks includes analyzing the situational awareness assessment data and generating a plurality of formats of one or more tilt orientations of the rear fan, wherein generating the one or more tilt orientations of the rear fan includes at least one of: generating the one or more projected graphical objects within the Doppler zone in a two dimensional format, generating the one or more projected graphical objects within the Doppler zone in a volumetric three dimensional format, generating the floor zone in one or more horizontal angles, and generating the floor zone in one or more vertical angles, generating the floor zone in an inverted format.

8. A system for providing situational awareness in a vehicle, comprising:
   a situational awareness subsystem that provides situational awareness of a surrounding environment of the vehicle;
   a sensor data compiling module of the situational awareness subsystem that receives environmental sensor data and vehicle performance data, wherein the sensor data compiling module compiles the environmental sensor data and the vehicle performance data;
   a situational awareness assessment module of the situational awareness subsystem that determines one or more situational risks that are posed to the vehicle that occur within the surrounding environment of the vehicle based on the compiled environmental sensor data and the vehicle performance data; and
   a situational awareness presentation module that generates one or more projected graphical objects that represent the one or more situational risks that are determined to be posed to the vehicle, wherein the situational awareness presentation module analyzes situational awareness assessment data received from the situational awareness assessment module and generates a virtual rear fan object (rear fan) that includes a virtual floor zone of interest object (floor zone) and a virtual Doppler zone of interest object (Doppler zone), wherein the floor zone and the Doppler zone include the one or more projected graphical objects that represent determined situational risks that are posed to the vehicle.

9. The system of claim 8, wherein the sensor data compiling module compiles a plurality of inputs that are simultaneously provided from one or more vehicle environment sensors, one or more vehicle performance sensors, and one or more external sources into situational awareness sensing data.

10. The system of claim 9, wherein the situational awareness assessment module analyzes the situational awareness sensing data and determines characteristics of at least one of: the surrounding environment of the vehicle, objects within the surrounding environment of the vehicle, and inherent driving attributes of the vehicle.

11. The system of claim 9, wherein the situational awareness assessment module assigns an environment classification to the surrounding environment of the vehicle and a severity score to one or more determined situational risks that are posed to the vehicle, wherein the environment classification includes a classification of the surrounding environment of the vehicle and the severity score includes a score that is assigned to each determined situational risk that is posed to the vehicle.

12. The system of claim 9, wherein the situational awareness presentation module analyzes the situational awareness assessment data received from the situational awareness assessment module and generates one or more formats of the floor zone and the Doppler zone, wherein generating one or more formats includes at least one of: generating the floor zone to be in an extended format, generating the floor zone of the Doppler zone to be in the extended format, generating the floor zone to be in a reduced format, generating the Doppler zone to be in a reduced format, generating the outline of the floor zone to be modified, generating the floor zone to represent one more environments in which the vehicle is being driven.

13. The system of claim 9, wherein the situational awareness presentation module analyzes the situational awareness assessment data received from the situational awareness assessment module and generates a plurality of formats of the one or more projected graphical objects, wherein generating different formats of the one or more projected graphical objects include modifying at least one of: size, color, shape, appearance, arrangement, and scale of the one or more projected graphical objects.

14. The system of claim 12, wherein the situational awareness presentation module analyzes the situational awareness assessment data received from the situational awareness assessment module and generates plurality of formats of one or more tilt orientations of the rear fan, wherein generating the one or more tilt orientations of the rear fan includes at least one of: generating the one or more projected graphical objects within the Doppler zone in a two dimensional format, generating the one or more projected graphical objects within the Doppler zone in a volumetric three dimensional format, generating the floor zone in one or more horizontal angles, and generating the floor zone in one or more vertical angles, generating the floor zone in an inverted format.

15. A non-transitory computer readable-storage medium storing instructions that when executed by a processor perform actions, comprising:
   receiving environmental sensor data and vehicle performance data;
   compiling the environmental sensor data and the vehicle performance data;
   determining one or more situational risks that are posed to a vehicle that occur within a surrounding environment of the vehicle based on the compiled environmental sensor data and the vehicle performance data; and
   generating one or more projected graphical objects that represent the one or more situational risks that are determined to be posed to the vehicle, wherein generating the one or more projected graphical objects that represent the one or more situational risks includes analyzing situational awareness assessment data and generating a virtual rear fan object (rear fan) that includes a virtual floor zone of interest object (floor zone) and a virtual Doppler zone of interest object (Doppler zone), wherein the floor zone and the Doppler zone include the one or more projected graphical objects that represent determined situational risks that are posed to the vehicle.

16. The non-transitory computer readable-storage medium of claim 15, wherein generating the one or more projected graphical objects that represent the one or more situational risks includes analyzing the situational awareness assessment data and generating one or more formats of the floor zone and the Doppler zone, wherein generating one or more formats includes at least one of: generating the floor zone to be in an extended format, generating the floor zone of the Doppler zone to be in the extended format, generating the floor zone to be in a reduced format, generating the Doppler zone to be in a reduced format, generating the outline of the floor zone to be modified, generating the floor zone to represent one more environments in which the vehicle is being driven.

17. The non-transitory computer readable-storage medium of claim 15, wherein generating the one or more projected graphical objects that represent the one or more situational risks includes analyzing the situational awareness assessment data and generating a plurality of formats of the one or more projected graphical objects, wherein generating different formats of the projected graphical objects include modifying at least one of: size, color, shape, appearance, arrangement, and scale of the one or more projected graphical objects.

* * * * *